United States Patent
Katzenberg et al.

(12) 
(10) Patent No.: US 6,218,930 B1
(45) Date of Patent: Apr. 17, 2001

(54) APPARATUS AND METHOD FOR REMOTELY POWERING ACCESS EQUIPMENT OVER A 10/100 SWITCHED ETHERNET NETWORK

(75) Inventors: Boris Katzenberg, Trumbull; Joseph A. Deptula, Watertown, both of CT (US)

(73) Assignee: Merlot Communications, Bethel, CT (US)

( * ) Notice: Subject to any disclaimer, the term of this patent is extended or adjusted under 35 U.S.C. 154(b) by 0 days.

(21) Appl. No.: 09/520,350

(22) Filed: Mar. 7, 2000

Related U.S. Application Data
(60) Provisional application No. 60/123,688, filed on Mar. 10, 1999.

(51) Int. Cl.[7] .................................................. M04M 11/04
(52) U.S. Cl. .......................... 340/310.01; 340/310.02; 340/310.06; 340/310.07; 379/386; 379/400; 379/32
(58) Field of Search .......................... 340/310.01, 310.07, 340/825.16, 310.02, 310.06; 379/386, 400, 32

(56) References Cited

U.S. PATENT DOCUMENTS

| | | |
|---|---|---|
| 5,144,544 | 9/1992 | Jenneve et al. |
| 5,289,359 * | 2/1994 | Ziermann ................... 363/21 |
| 5,406,260 * | 4/1995 | Cummings et al. ........... 340/568 |
| 5,461,671 * | 10/1995 | Sakuragi et al. ............ 379/400 |
| 5,483,574 * | 1/1996 | Yuyama ..................... 379/32 |
| 5,608,792 * | 3/1997 | Laidler ..................... 379/386 |

* cited by examiner

Primary Examiner—Jeffery A. Hofsass
Assistant Examiner—Tai T. Nguyen
(74) Attorney, Agent, or Firm—William C. Crutcher

(57) ABSTRACT

Apparatus for remotely powering access equipment over a 10/100 switched Ethernet network comprises an Ethernet switch card with a phantom power supply for remote access equipment and added circuitry for automatic detection of remote equipment being connected to the network; determining whether the remote equipment is capable of accepting remote power in a non-intrusive manner; delivering the phantom power to the remote equipment over the same wire pairs that deliver the data signals, and automatically detecting if the remote equipment is removed from the network.

9 Claims, 3 Drawing Sheets

Figure 1:
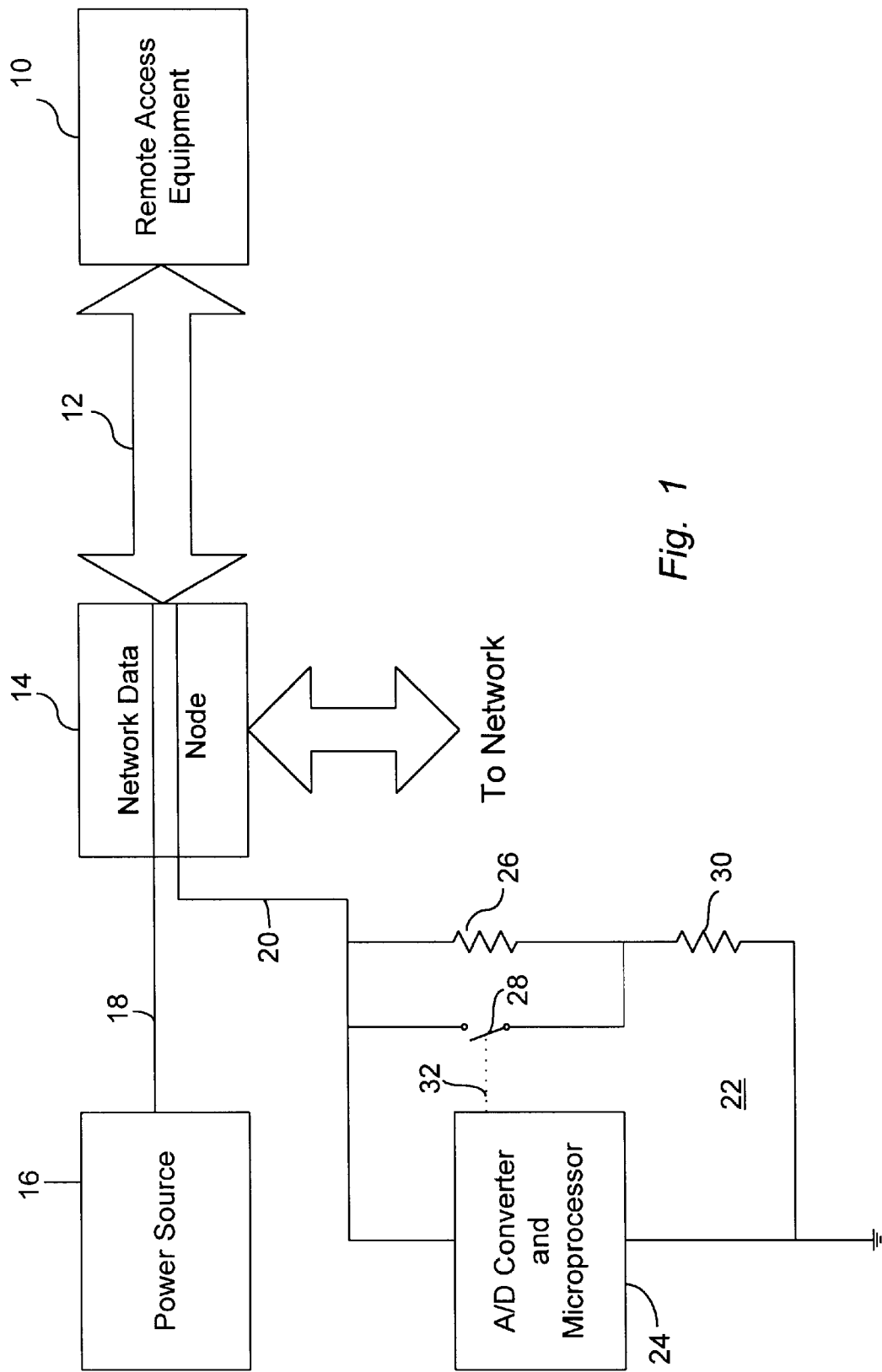

APPARATUS AND METHOD FOR REMOTELY POWERING ACCESS EQUIPMENT OVER A 10/100 SWITCHED ETHERNET NETWORK

CROSS REFERENCE TO RELATED APPLICATIONS

This application claims the benefits of prior filed, application Ser. No. 60/123,688 filed Mar. 10, 1999.

FIELD OF THE INVENTION

This invention broadly relates to the powering of 10/100 Ethernet compatible equipment. The invention more particularly relates to apparatus and methods for automatically determining if remote equipment is capable of remote power feed and if it is determined that the remote equipment is able to accept power remotely then to provide power in a reliable non-intrusive way.

BACKGROUND OF THE INVENTION

A variety of telecommunications equipment is remotely powered today. Telephones and Network Repeater devices are examples of remotely powered equipment. Obviously there are many advantages to remotely powering equipment, however this technique has not migrated to data communications equipment for several reasons. Data communications equipment has traditionally required high power levels to operate which has made it prohibitive to implement. The widely distributed nature as well as the use of shared media used in data networks has also made remote power impractical.

The desire to add remotely powered devices to a data network is being pushed by the convergence of voice and data technologies. The advent of IP Telephony, Voice over IP and Voice over Packet technologies has brought traditional telephony requirements into the data environment. It is not desirable to have a phone powered by a local wall transformer. It is desirable to have a centrally powered system that can be protected during a power outage.

It is therefore an object of the invention to provide methods and apparatus for reliably determining if a remote piece of equipment is capable of accepting remote power.

It is another object of this invention to provide methods and apparatus for delivering remote power to remote equipment over 10/100 switched Ethernet segments and maintain compliance with IEEE 802.3 standards.

SUMMARY OF THE INVENTION

In accord with the objects of the invention an apparatus for remotely powering access equipment over a 10/100 switched Ethernet network comprises: automatic detection of remote equipment being connected to the network; determining whether the remote equipment is capable of accepting remote power in a non-intrusive manner; delivering the power to remote equipment over the same wire pairs that deliver the data signals; automatic detection of remote equipment being removed from the network.

The complete apparatus comprises a data node adapted for data switching, an access device adapted for data transmission, at least one data signaling pair connected between the data node and the access device and arranged to transmit data therebetween, a main power source connected to supply power to the data node, a secondary power source arranged to supply power from the data node via the data signaling pair to the access device, sensing means for delivering a low level current from said main power source to the access device over the data signaling pair and sensing a resulting voltage level thereon, and control means responsive to said voltage level and adapted to control power supplied by the secondary power source to said access device in response to a preselected condition of the voltage level.

The method includes the steps of delivering a low level current from the main power source to the access device over the data signaling pair, sensing a voltage level on the data signaling pair in response to the low level current, and controlling power supplied by the secondary power source to the access device in response to a preselected condition of the voltage level.

DRAWINGS

Figure 2:
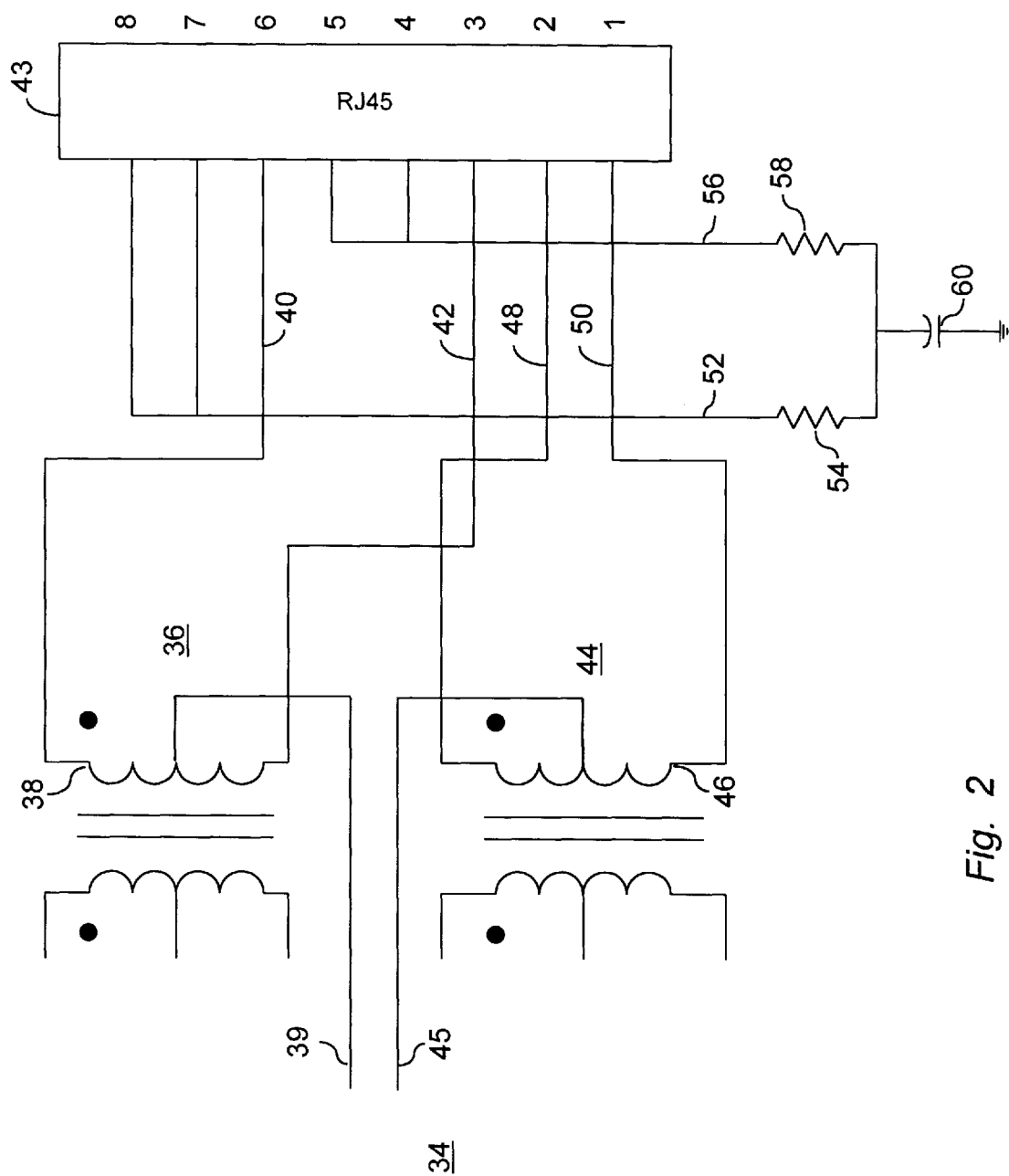
Figure 3:
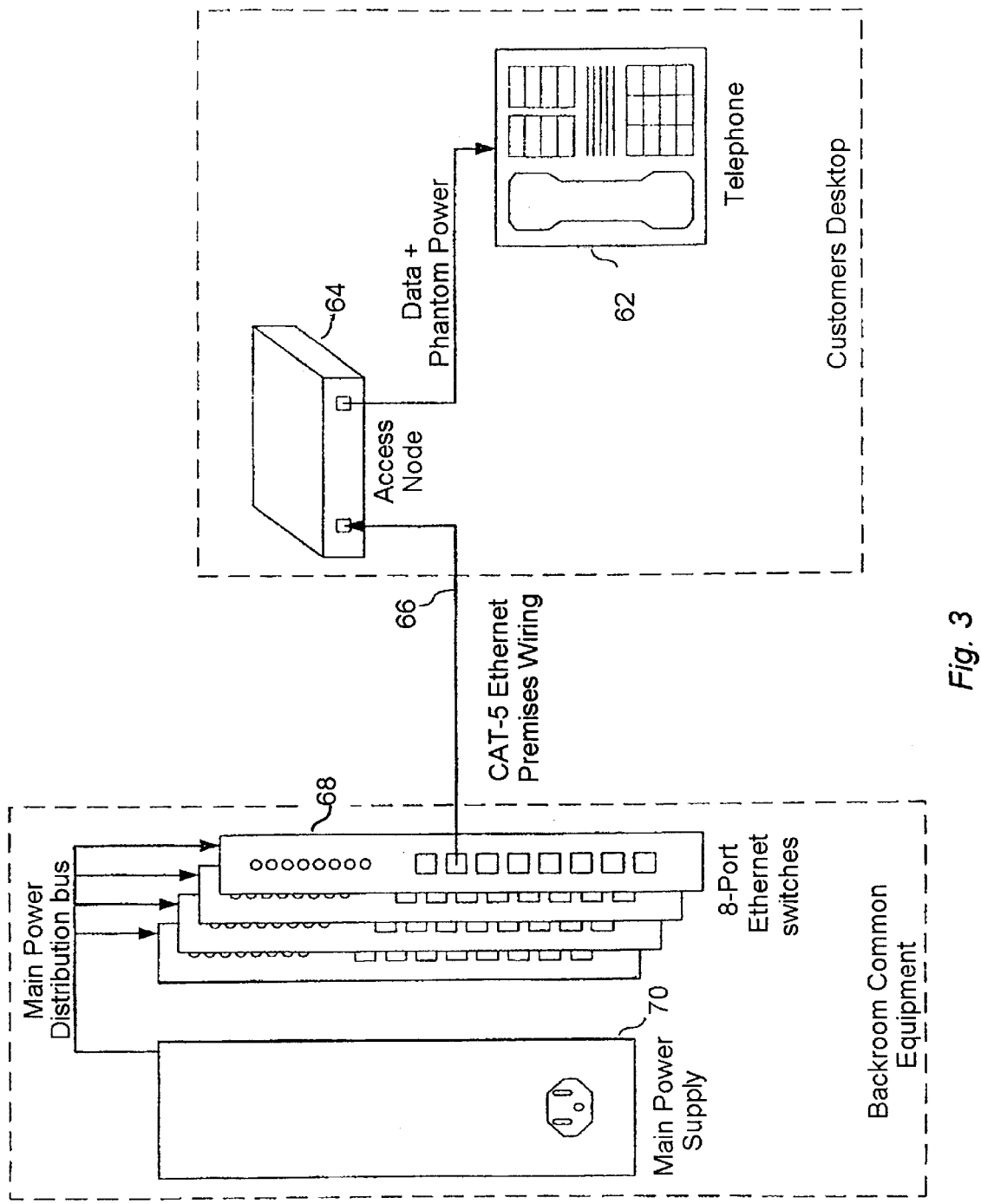

The invention will be more clearly understood by reference to the following description, taken in connection with the accompanying drawings, in which:

FIG. 1 is a simplified schematic diagram of the remote power automatic detection system of the present invention, shown in conjunction with a single unit of remote access equipment connected as part of an Ethernet local area network, FIG. 2 is a simplified schematic drawing of a power feed configuration for supplying power to the remote access equipment on the local area network, and FIG. 3 is a simplified physical layout of a portion of a switched Ethernet network segment showing a telephone device powered through the network data carrying medium.

DESCRIPTION OF THE PREFERRED EMBODIMENT

Referring now to FIG. 1 of the drawing, a remote access device 10 which is compatible with 10/100 Ethernet requirements is connected through a data communications network interface adapter to a high data rate network cable 12. Remote access device 10 requires power to carry out its operation and includes an internal dc-dc switching supply which, in the absence of the present invention, would be supplied by an ac transformer adapter plugged in to the local 110 volt supply. Cable 12 is preferably Category 5 wiring such as 100BaseX suitable for 100 Mb/s data communications over a switched Ethernet network, and is connected to a port in a network data node 14, such as a switch or hub. Ethernet frames containing data are transmitted over cable 12 between node 14 and device 10, and from node 14 to and from the network in accordance with selected protocols in a conventional manner known in the art.

In accordance with the present invention, a power source 16, which may be the same as the conventional main power supply used to power the node 14, is connected to cable 12 via lines 18 to supply a power level sensing potential to the remote access equipment 10 over one of the cable conductors. A return path from remote access equipment 10 is connected through a lead 20 to an automatic remote power detector, shown generally as 22. Detector 22 includes an A/D converter and microprocessor control unit 24, operating a detection circuit consisting of a resistor 26, with shunting switch 28, both connected in parallel to a resistor 30, providing a path to ground. Switch 28 is actually an internal software controlled switch depicted diagrammatically as actuated by operator 32.

Automatic detection of remote equipment being connected to the network is accomplished by delivering a low level current (approx. 20 ma) to the network interface and measuring a voltage drop in the return path. There are three states which can be determined: no voltage drop, a fixed level voltage drop or a varying level voltage drop. If no voltage drop is detected then the remote equipment does not contain a dc resistive termination, and this equipment is identified as unable to support remote power feed. If a fixed voltage level is detected then the remote equipment contains a dc resistive termination (a "bob smith" is typical for Ethernet terminations), and this equipment is identified as unable to support remote power feed.

If a varying voltage level is detected, this identifies the presence of dc-dc switching supply in the remote equipment. The varying level is created by the remote power supply beginning to start up but the low current level is unable to sustain the start up. This cycle continues to be repeated creating a "sawtooth" voltage level in the return path. When this cycle is confirmed, switch S1 is closed which increases the power output to the remote equipment. When the power to the remote equipment reaches the proper level the remote power supply turns on and the remote equipment becomes active. At this point a second, software level, confirmation takes place. The remote equipment must respond to a poll using a coded response with a unique MAC address. When this process is complete the remote equipment is identified as known access equipment capable of accepting remote power.

Referring now to FIG. 2 of the drawing, a suitable remote power supply is shown generally as 34, which may be conveniently incorporated into an Ethernet 8 port switch card. A first center tap data transformer 36 includes a transformer winding 38 with opposite ends connected by leads 40, 42 to terminals 6, 3 respectively of an RJ45 connector 43. A second center tap transformer 44 with a transformer winding 46 has its opposite ends connected via leads 48, 50 to terminals 2, 1 respectively of the connector 43. Power feed is through a center tap lead 39 and power return is through a center tap lead 45. Inactive terminals 7, 8 of connector 43 are connected via lead 52 to a resistor 54. Inactive terminals 1, 2 of connector 43 are connected via lead 56 to a resistor 58. A junction between resistors 54 and 58 is connected to ground via a capacitor 60.

Remote power is delivered to the remote equipment over the existing data signaling pairs (phantom power feed). Although it is typical that all 8 signal leads are delivered to remote equipment, only the 4 signaling leads are guaranteed in practice. See FIG. 2 for the power feed configuration.

Once the remote equipment is operating and confirmed as a known remote power enabled device, the logic circuit shown in FIG. 1 begins to look for removal of the remote equipment or an overload fault condition. If the measured voltage level drops, then this indicates that the remote equipment has been removed and the logic circuit returns to the initial hunt state. If an overload condition is detected then the logic circuit returns to its initial state. It can then be programmed to either wait for the fault state to be cleared or continue to cycle through the state machine.

FIG. 3 illustrates the physical layout of components corresponding to the schematic diagram of FIG. 1. The remote access equipment in this case is a telephone 62 equipped to handle data communications as well as voice and is connected through an access node 64 to premises wiring 66, comprising a Category 5 Ethernet 100BaseX cable of 4 sets of unshielded twisted pairs, which carry both data and power to the telephone 62. Wiring 66 is connected to one of the ports of an 8 port Ethernet switch 68 which is powered from a main power supply 70. The Ethernet switch card incorporates the automatic remote power detector 22 discussed in FIG. 1 and the remote power supply 34 discussed in FIG. 2. The power is provided over the wiring 66 both to the remote access node 64 and telephone 62.

While there is disclosed what is considered to be the preferred embodiment of the invention, other modifications will occur to those skilled in the art.

What is claimed is:

1. Apparatus for remotely powering access equipment in a data network, comprising:

a data node adapted for data switching, an access device adapted for data transmission, at least one data signaling pair connected between the data node and the access device and arranged to transmit data therebetween, a main power source connected to supply power to the data node, a secondary power source arranged to supply power from the data node via said data signaling pair to the access device, sensing means for delivering a low level current from said main power source to the access device over said data signaling pair and sensing a resulting voltage level thereon, and control means responsive to said voltage level and adapted to control power supplied by said secondary power source to said access device in response to a preselected condition of said voltage level.

2. Apparatus according to claim 1, wherein there are at least two data signaling pairs connected between the data node and the access device to supply phantom power from the secondary power source to the access device, and wherein said access device includes a pair of data transformers having center taps connected for locally powering the access device.

3. Apparatus according to claim 1, wherein said preselected condition comprises a varying "sawtooth" voltage level detected by said sensing means which causes said control means to increase the power supply from the secondary power source to the access device.

4. Apparatus according to claim 1, wherein the data node is an Ethernet switch card incorporating said secondary power supply, said sensing means and said control means.

5. Apparatus according to claim 1, and further including a software program associated with said control means and arranged to poll the access device to identify itself and confirm that it is capable of accepting remote power.

6. Method for remotely powering access equipment in a data network, comprising, providing a data node adapted for data switching, an access device adapted for data transmission, at least one data signaling pair connected between the data node and the access device and arranged to transmit data therebetween, a main power source connected to supply power to the data node, and a secondary power source arranged to supply power from the data node via said data signaling pair to the access device, delivering a low level current from said main power source to the access device over said data signaling pair, sensing a voltage level on the data signaling pair in response to the low level current, and controlling power supplied by said secondary power source to said access device in response to a preselected condition of said voltage level.

7. Method according to claim 6, including the step of:
increasing power supplied to the access device in response to a "sawtooth" voltage level sensed on the data signaling pair.

8. Method according to claim 6, including the step of polling the access device to identify it and confirm that it is capable of accepting remote power.

9. Method according to claim 6, including the step of continuing to sense voltage level and to decrease power from the secondary power source if voltage level drops on the data signaling pair, indicating removal of the access device.

* * * * *

(12) EX PARTE REEXAMINATION CERTIFICATE (10326th)

United States Patent
Katzenberg et al.

(10) Number: US 6,218,930 C1
(45) Certificate Issued: Oct. 14, 2014

(54) APPARATUS AND METHOD FOR REMOTELY POWERING ACCESS EQUIPMENT OVER A 10/100 SWITCHED ETHERNET NETWORK

(75) Inventors: Boris Katzenberg, Trumbull, CT (US); Joseph A. Deptula, Watertown, CT (US)

(73) Assignee: Network-1 Security Solutions, Inc., Framingham, MA (US)

Reexamination Request:
No. 90/012,401, Jul. 20, 2012

Reexamination Certificate for:
Patent No.: 6,218,930
Issued: Apr. 17, 2001
Appl. No.: 09/520,350
Filed: Mar. 7, 2000

Related U.S. Application Data

(60) Provisional application No. 60/123,688, filed on Mar. 10, 1999.

(51) Int. Cl.
*H04L 12/10* (2006.01)

(52) U.S. Cl.
USPC .................. 370/200; 340/12.32; 340/12.37; 340/12.38; 379/386; 379/400

(58) Field of Classification Search
None
See application file for complete search history.

(56) References Cited

To view the complete listing of prior art documents cited during the proceeding for Reexamination Control Number 90/012,401, please refer to the USPTO's public Patent Application Information Retrieval (PAIR) system under the Display References tab.

*Primary Examiner* — Simon Ke

(57) ABSTRACT

Apparatus for remotely powering access equipment over a 10/100 switched Ethernet network comprises an Ethernet switch card with a phantom power supply for remote access equipment and added circuitry for automatic detection of remote equipment being connected to the network; determining whether the remote equipment is capable of accepting remote power in a non-intrusive manner; delivering the phantom power to the remote equipment over the same wire pairs that deliver the data signals, and automatically detecting if the remote equipment is removed from the network.

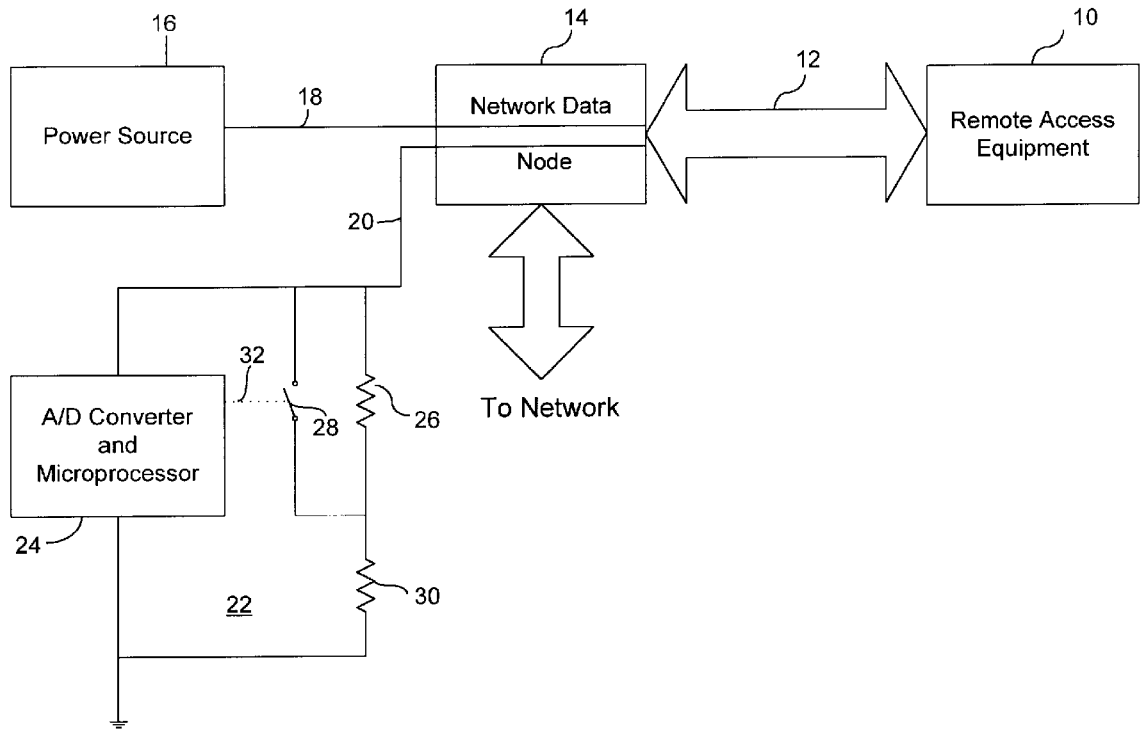

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6, 8 and 9 is confirmed.

New claims 10-23 are added and determined to be patentable.

Claims 1-5 and 7 were not reexamined.

*10. Method according to claim 6, wherein said data node is an Ethernet switch.*

*11. Method according to claim 6, wherein said data signaling pair is a pair of wires used to transmit data within an Ethernet cable.*

*12. Method according to claim 6, wherein said low level current is a current used to determine whether the access device is capable of accepting remote power.*

*13. Method according to claim 6, wherein said low level current is insufficient to operate said access device, but sufficient to generate a voltage level on said data signaling pair that is used to determine whether said access device is capable of accepting remote power.*

*14. Method according to claim 6, wherein controlling power supplied by the secondary power source involves increasing the level of the low level current to a level sufficient to operate said access device.*

*15. Method according to claim 6, wherein said secondary power source is the same source of power as said main power source.*

*16. Method according to claim 6, wherein said secondary power source is the same physical device as the main power source.*

*17. Method according to claim 6, wherein said main power source provides a DC current flow.*

*18. Method according to claim 6, wherein there are at least two data signaling pairs connected between the data node and the access device.*

*19. Method according to claim 6, wherein sensing the voltage level on the data signaling pair includes at least two sensed measurements.*

*20. Method for remotely powering access equipment in an Ethernet data network, comprising,*
  *(a) providing*
    *(i) an Ethernet data node adapted for data switching,*
    *(ii) an access device adapted for data transmission,*
    *(iii) at least one data signaling pair connected between the data node and the access device and arranged to transmit data therebetween,*
    *(iv) a main power source connected to supply power to the data node, and*
    *(v) a secondary power source arranged to supply power from the data node via said data signaling pair to the access device,*
  *(b) delivering a low level current from said main power source to the access device over said data signaling pair,*
  *(c) sensing a voltage level on the data signaling pair in response to the low level current,*
  *(d) determining whether the access device is capable of accepting remote power based on the sensed voltage level, and*
  *(e) controlling power supplied by said secondary power source to said access device in response to a preselected condition of said voltage level.*

*21. Method for remotely powering access equipment in an Ethernet data network, comprising,*
  *(a) providing*
    *(i) a data node adapted for data switching,*
    *(ii) an access device adapted for data transmission,*
    *(iii) at least one data signaling pair connected between the data node and the access device and arranged to transmit data therebetween,*
    *(iv) a main power source connected to supply power to the data node, and*
    *(v) a secondary power source arranged to supply power from the data node via said data signaling pair to the access device,*
  *(b) delivering a current from said main power source to the access device over said data signaling pair, said current being insufficient, by itself, to operate said access device connected to the data signaling pair;*
  *(c) sensing a voltage level on the data signaling pair in response to the current, and*
  *(d) controlling power supplied by said secondary power source to said access device in response to a preselected condition of said voltage level.*

*22. Apparatus for remotely powering access equipment in a data network, comprising:*
  *(a) a data node adapted for data switching,*
  *(b) an access device adapted for data transmission,*
  *(c) at least one data signaling pair connected between the data node and the access device and arranged to transmit data therebetween,*
  *(d) a main power source connected to supply power to the data node and deliver a low level current from said main power source to the access device over said at least one data signaling pair resulting in a voltage level on the data signaling pair that can be sensed in response to the low level current,*
  *(e) a secondary power source arranged to supply power from the data node via said data signaling pair to the access device, wherein the power supplied by said secondary power source to the access device is controlled in response to a preselected condition of the sensed voltage level.*

*23. Method for remotely powering access equipment in an Ethernet data network, comprising:*
  *(a) providing an access device adapted for data transmission;*
  *(b) connecting said access device to at least one data signaling pair connected between the access device and a data node adapted for data switching, wherein said at least one data signaling pair is arranged to transmit data therebetween;*
  *(c) receiving at said access device a low level current from a main power source over said data signaling pair, wherein said main power source is connected to supply power to the data node; and wherein a voltage level is generated on the data signaling pair in response to the low level current;*
  *(d) producing a voltage level on the data signaling pair in response to the low level current, wherein said voltage level can be sensed;*

(e) receiving at said access device controlled power supplied by a secondary power source arranged to supply power from the data node via said data signaling pair to the access device, in response to a preselected condition of said voltage level.

\* \* \* \* \*

/ (12) EX PARTE REEXAMINATION CERTIFICATE (10759th)

United States Patent
Katzenberg et al.

(10) Number: US 6,218,930 C2
(45) Certificate Issued: Nov. 9, 2015

(54) APPARATUS AND METHOD FOR REMOTELY POWERING ACCESS EQUIPMENT OVER A 10/100 SWITCHED ETHERNET NETWORK

(75) Inventors: Boris Katzenberg, Trumbull, CT (US); Joseph A. Deptula, Watertown, CT (US)

(73) Assignee: NETWORK-1 SECURITY SOLUTIONS, INC., Framingham, MA (US)

Reexamination Request:
No. 90/013,444, Feb. 16, 2015

Reexamination Certificate for:
Patent No.: 6,218,930
Issued: Apr. 17, 2001
Appl. No.: 09/520,350
Filed: Mar. 7, 2000

Reexamination Certificate C1 6,218,930 issued Oct. 14, 2014

Related U.S. Application Data

(60) Provisional application No. 60/123,688, filed on Mar. 10, 1999.

(51) Int. Cl.
H04L 12/10 (2006.01)
H04L 12/931 (2013.01)

(52) U.S. Cl.
CPC ............... *H04L 12/10* (2013.01); *H04L 49/351* (2013.01); *H04L 49/40* (2013.01)

(58) Field of Classification Search
None
See application file for complete search history.

(56) References Cited

To view the complete listing of prior art documents cited during the proceeding for Reexamination Control Number 90/013,444, please refer to the USPTO's public Patent Application Information Retrieval (PAIR) system under the Display References tab.

*Primary Examiner* — Mark Sager

(57) ABSTRACT

Apparatus for remotely powering access equipment over a 10/100 switched Ethernet network comprises an Ethernet switch card with a phantom power supply for remote access equipment and added circuitry for automatic detection of remote equipment being connected to the network; determining whether the remote equipment is capable of accepting remote power in a non-intrusive manner; delivering the phantom power to the remote equipment over the same wire pairs that deliver the data signals, and automatically detecting if the remote equipment is removed from the network.

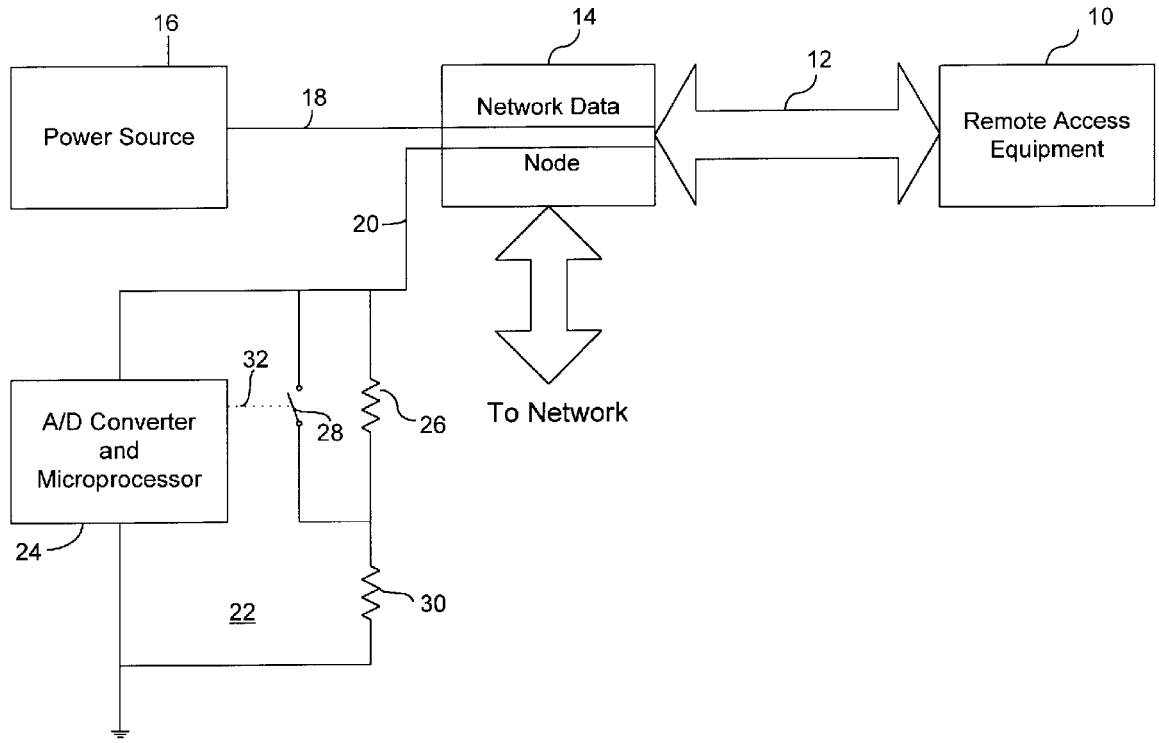

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 6 and 8-23 is confirmed.

Claims 1-5 and 7 were not reexamined.

\* \* \* \* \*